(12) United States Patent
Chandran et al.

(10) Patent No.: US 7,392,279 B1
(45) Date of Patent: Jun. 24, 2008

(54) NETWORK TRAFFIC SHAPING USING TIME-BASED QUEUES

(75) Inventors: Kartik S. Chandran, Sunnyvale, CA (US); Guenter Roeck, San Jose, CA (US); Sunil Khaunte, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 152 days.

(21) Appl. No.: 09/276,917

(22) Filed: Mar. 26, 1999

(51) Int. Cl.
*G06F 15/16* (2006.01)

(52) U.S. Cl. ............ 709/200; 370/230.1; 370/235; 370/395.4; 370/412; 719/314; 718/102

(58) Field of Classification Search ............ 717/153; 370/412, 60, 229, 230, 395, 235, 429, 236.1, 370/395.42; 709/240
See application file for complete search history.

(56) References Cited

U.S. PATENT DOCUMENTS

| 4,435,753 | A | * | 3/1984 | Rizzi ............................ 364/200 |
| 5,231,633 | A | * | 7/1993 | Hluchyj et al. ............... 370/429 |
| 5,317,562 | A | * | 5/1994 | Nardin et al. |
| 5,463,620 | A | * | 10/1995 | Sriram .......................... 370/60 |
| 5,754,530 | A | * | 5/1998 | Awdeh et al. ............... 370/236.1 |
| 5,838,915 | A |   | 11/1998 | Klausmeier et al. ..... 395/200.45 |
| 6,052,375 | A | * | 4/2000 | Bass et al. ..................... 370/412 |
| 6,104,700 | A | * | 8/2000 | Haddock et al. ............. 370/235 |
| 6,195,333 | B1 | * | 2/2001 | Wise ............................. 370/235 |
| 6,247,061 | B1 | * | 6/2001 | Douceur et al. |
| 6,259,699 | B1 | * | 7/2001 | Opalka et al. |
| 6,389,019 | B1 | * | 5/2002 | Fan et al. ................. 370/395.42 |
| 6,404,737 | B1 | * | 6/2002 | Novick et al. ............ 370/235.1 |
| 6,438,134 | B1 | * | 8/2002 | Chow et al. ................... 370/412 |
| 6,526,062 | B1 | * | 2/2003 | Milliken et al. ......... 370/395.42 |
| 6,621,792 | B1 | * | 9/2003 | Petty ........................ 370/230.1 |
| 6,724,767 | B1 | * | 4/2004 | Chong et al. ................. 370/412 |

OTHER PUBLICATIONS

R. Ladner, "CSE 326: Data Structures", Spring 1998, Lecture Overheads: Lecture 19, Calendarqueues.
Randy Brown, "Calendar Queues: A Fast 0(1) Priority Queue Implementation For the Simulation Even Set Problem", Oct. 1988. vol. 31, Communications of the ACM.
LSI Logic Corporation, "LSI Logic's L64364 ATMizer II+ ATM-SAR Chip Technical Manual" Chapter 7, Nov. 16, 1998.
R. Ladner, "CSE 326: Data Structures", Spring 1998, Lecture Overheads: Lecture 19, Calendarqueues, month unknown.

* cited by examiner

*Primary Examiner*—Dustin Nguyen
(74) *Attorney, Agent, or Firm*—Weaver Austin Villeneuve & Sampson LLP

(57) ABSTRACT

A time-based buffering system buffers data based upon how long the data should be held in order to comply with a traffic shaping policy. The data's source or destination need not be considered in determining where to buffer the data. The time-based buffering system includes a collection of time-based queues, each of which has a different time to dequeue. The system controlling traffic shaping determines how long a particular piece of data should be buffered (a "traffic shaping delay") until it can be put on the network. Then, based upon that length of time, the system chooses one of the time-based of queues in which to buffer the data. That chosen queue has a dequeuing time that matches the traffic shaping delay. After the chosen queue dequeues its contents (at the specified time), it assumes a new dequeing time and is free to buffer new data that must be delayed by a time matching the new dequeuing time.

29 Claims, 11 Drawing Sheets

NETWORK TRAFFIC SHAPING USING TIME-BASED QUEUES

BACKGROUND OF THE INVENTION

This invention relates to systems and methods for controlling traffic to particular destinations ("data flows") on a network. The invention accomplishes this using a time-based queuing system comprising a series of queues, each of which buffers packets for a defined length of time.

Traffic shaping involves limiting the rate at which data is transmitted to particular locations on a network (e.g., to network interfaces or network destinations). This may be employed to prevent congestion on a particular network segment or to limit a network entity to the amount of bandwidth that it has paid for. A network employs a "policing" algorithm to determine when traffic to or from a particular network user should be limited.

If a policing algorithm determines that the network interface is at a maximum usage rate, it may limit the flow of network traffic accordingly. Typically, traffic flow is limited by simply discarding or dropping packets to or from a network interface. This means that the discarded packets must be retransmitted at a later time when the network flow is not at the maximum level allowed by the policing algorithm. Administration of the retransmissions is handled by TCP or other relatively high level network protocol. Putting this burden on TCP often places too much responsibility on the protocol (which plays many other roles in administering network traffic) and thereby greatly reduces the network performance. This may be manifest by short periods of very bursty traffic followed by extended quiet periods.

One potential solution to this difficulty employs separate queues for each individual interface or destination that requires flow control. Unfortunately, this solution does not scale well for systems having many destinations. Each new network destination requires a new and separate queue. And each new separate queue requires its own additional memory and its own additional CPU resources (overhead to identify the appropriate queue, etc.). If a system needs to service 5000 destinations, then it also needs to provide and service 5000 distinct queues.

What is needed, therefore, is an improved technique for traffic shaping on a per-destination basis. The technique should not unnecessarily discard packets when a maximum flow rate is exceeded and should not rely on a single queue for each destination under consideration.

SUMMARY OF THE INVENTION

The present invention provides a time-based buffering system that buffers network data (e.g., packets) based upon how long the data should be held in order to comply with a traffic shaping policy. The data's source or destination need not be considered—although it can be—in determining how and where to buffer the data. Typically the time-based buffering system includes a collection of time-based queues (sometimes referred to as "buckets"), each of which is scheduled for a different time to dequeue. The system controlling traffic shaping may determine how long a particular piece of data should be buffered (a "traffic shaping delay") until it can be put on the network. Then, based upon that length of time, the system chooses one of the time-based queues in which to buffer the data. That chosen queue has a dequeuing time that matches the traffic shaping delay. Queue identifications may be recycled, so that after a chosen queue dequeues its contents (at the specified time), it is rescheduled for a new dequeing time. It is then available to buffer new data that must be delayed by a time matching the new dequeuing time. Preferably, a given time-based queue can simultaneously buffer data associated with different nodes. Preferably, it can also buffer network data packets of varying sizes.

One aspect of the invention relates to a method of controlling data flow through a network. The method may be characterized by the following sequence: (1) determining that transmitting additional data to or from a particular network node will or will likely exceed a maximum allowed data flow for the network node; (2) selecting one of a group of time-based queues; and (3) buffering the additional data in the selected time-based queue. Together, the time-based queues define a period of time. Each time-based queue defines a separate increment of time within the time period, and each time-based queue is set to dequeue its contents at a separate time. For example, a group of three time-based queues may each have 40 millisecond increments of time. Together they may define a period of time of 120 milliseconds. Initially, a first of these queues may be set to dequeue in 40 milliseconds, a second to dequeue in 80 milliseconds, and a third to dequeue in 120 milliseconds. At 40 milliseconds, the first queue dequeues its contents and it may be set with a new dequeue time of 120 milliseconds. At that time, the second queue's time to dequeue is 40 milliseconds and the third queue's time to dequeue is 80 milliseconds in the future.

In a specific embodiment, the increments of time defined by the time-based queues are each between about 1 and 50 milliseconds, and the total period of time defined by the group of time-based queues is between about 100 and 500 milliseconds.

Typically, the system will have to calculate a time to transmit the additional data (the traffic shaping delay). This calculation may be based upon traffic shaping criteria such as those provided in a conventional policing algorithm. It can involve, for example, calculating an amount of network capacity that would be used by the network node if the additional data were to be transmitted. After calculating the traffic shaping delay for the additional data, the system selects the time-based queue having a time to dequeue that matches the calculated traffic shaping delay. Then, when that queue dequeues the additional data, the network can transmit that data without exceeding the maximum allowed data flow for the network.

Note that if the system determines that transmitting the additional data under consideration will not exceed the maximum allowed data flow for the associated network node, it may transmit that data without buffering. In this case, the system need not use the time-based queues. At the other extreme, the system may determine that the traffic shaping delay is so long that the new data should be discarded without buffering in the time-based queues. In that case, as well, the system will not need to use the time-based queues. Typically, this will occur when the traffic shaping delay is greater than a maximum shaping delay (e.g., the total period of time defined by the group of individual time-based queues (e.g., 120 milliseconds in the above example)).

In the discussion so far, the system has considered the effect of transmitting actual network data (e.g., packets) that it has received. There are other situations that may employ the time-based buffering of this invention. One notable example involves allocating "grants to transmit" additional data in networks such as cable modem plants. The system may buffer these grants to transmit in time-based queues in the same manner that it buffers simple data. When the time-based queue dequeues its grant(s) to transmit, the node receiving the grant may transmit actual data at the time specified by the grant. That time should conform to the system's traffic shaping criteria.

Another aspect of the invention provides a computer program product having program instructions stored on a machine-readable medium (e.g., memory in a router or other network device or a separate and portable CD-ROM). The program instructions may specify one or more of the method sequences described above.

Another aspect of the invention provides an apparatus for controlling data flow through a network. The apparatus may be characterized by the following features: (1) one or more processors; (2) memory coupled to at least one of the one or more processors; (3) and a plurality of time-based queues, as described above, logically configured on the memory. The processors are configured or designed to direct (i) data or (ii) grants to transmit data to particular time-based queues based upon the requirements of a network traffic shaping policy prescribed for the data or grants to transmit the data. Preferably the apparatus is a router or a switch. It may be a cable modem termination system.

The one or more processors may have additional roles. For example, they may determine the network traffic shaping delay required for the data or grant to transmit data. And, based upon the delay, the one or more processors may discard data or a request to grant transmission of data if the delay is greater than the maximum traffic shaping delay (e.g., the period of time defined by the plurality of time-based queues). Further, the one or more processors can be configured or designed to transmit, without buffering in a time-based queue, the data or grants to transmit data if there is no network traffic shaping delay.

As suggested above, a processor (or the apparatus generally) may direct network packets of varying sizes to the time-based queues. Still further, a single time-based queue may simultaneously buffer data or grants to transmit data from or to different network nodes. In other words, the time-based queue is not dedicated to a particular network node. This overcomes the above-described difficulties associated with destination-based queuing for traffic shaping.

These and other features and advantages of the present invention will be described below with reference to the associated drawings.

DETAILED DESCRIPTION OF THE PREFERRED EMBODIMENTS

As mentioned, this invention pertains to buffering data in time-based queues. A time-based queue is a queue that dequeues its contents (i.e., items that it is buffering) at scheduled times. In most embodiments described herein, a time-based queue will dequeue all of its contents at the scheduled time. However, there may be alternative embodiments in which it is desirable to dequeue only a portion of a time-based queue's buffered data. A time-based queue will typically be implemented with a plurality of like queues concatenated in time. The first of these queues may dequeue after a particular increment of time has elapsed. Thereafter, after that same increment of time has elapsed a second time, the second time-based queue dequeues its contents. Then, after yet another such increment of time elapses, a third queue dequeues its contents and so on. In this manner, every so many milliseconds, one of the time-based queues dequeues its contents.

This approach to queueing network data is very easy to implement and scales very well with additional destinations. The network interface or other system managing the time-based queues need only keep track of the increment of dequeuing time associated with the concatenated time-based queues. It need not keep track of the data destinations.

Time-Based Queuing Systems

Figure 1:
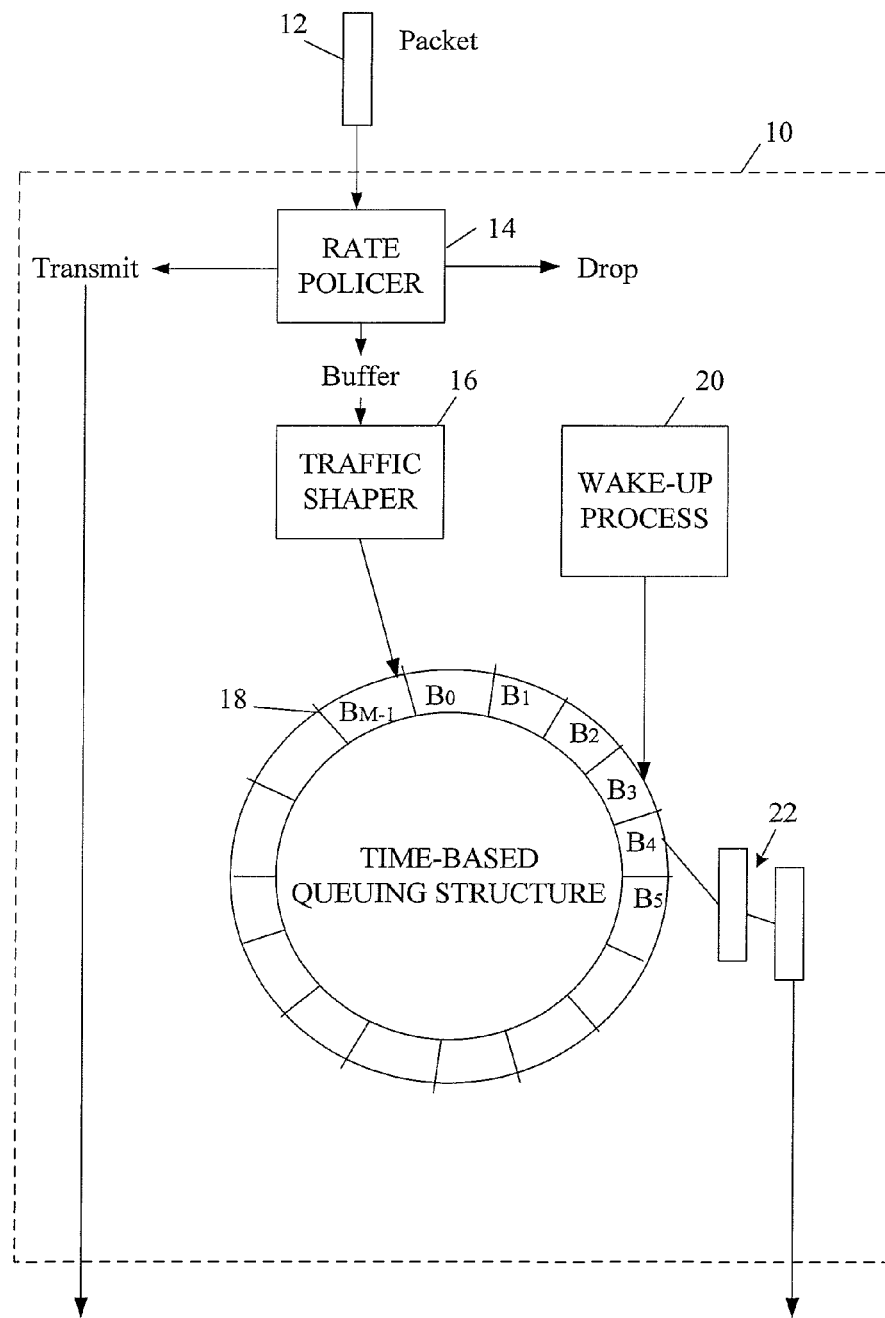
FIG. 1 is a block diagram illustrating the logical elements of a time-based queuing system implemented on a network device or devices, in accordance with an embodiment of this invention.

One approach to time-based queuing of network data is depicted in FIG. 1. As shown there, a network interface 10 or other network entity initially receives a packet 12. Possibly, interface 10 connects a local network (e.g., a LAN or cable plant) to an outside network. Packet 12 may have arrived from either a local node interior to the interface or a source exterior to the interface (e.g., an Internet source).

Interface 10 must control traffic to or from particular network nodes for which it is responsible. Those nodes may have limitations in (1) the rate that they can send traffic over a network, (2) the rate that they can receive traffic from the network, or (3) the total rate that they can send and receive traffic over the network. Thus, interface may have to shape traffic addressed to a particular network node and/or shape traffic sent by that node.

Within interface 10, packet 12 is considered by a policing block (or policer) 14, which implements a policing algorithm. That may be implemented as hardware, firmware, or software executed on one or more processors. Policing block 14 determines whether the packet should be transmitted, dropped, or buffered in a time-based queue. Policing block 14 implements a policing policy specifying the criteria for transmitting, dropping and buffering. Many such policing algorithms may be employed. Examples include "token bucket" and "leaky bucket" algorithms.

In one example, block 14 first determines whether the packet destination (or source) has exceeded an allowed amount of traffic on the network. If not, block 14 transmits packet 12 to its destination. If, on the other hand, the amount of traffic allowed to the destination or source has been exceeded, block 14 must determine whether to drop or buffer packet 12. The details of this procedure will be explained below. If the packet is dropped, a high level service such as TCP must recognize this and retransmit packet 12 at a later time.

Assuming that block 14 determines that packet 12 should be buffered, it passes that packet to a traffic-shaping block 16. That block then determines where to buffer packet 12. It will buffer the packet in one of the time-based queues comprising a time-based queuing structure 18. Note that the individual time-based queues in structure 18 are sometimes referred to herein as "buckets." Each queue is a chain of buffers—each buffer is a queue element. The data (packet 12) is actually stored in a buffer.

At any given time, queuing structure 18 may have its time-based queues populated with a variety of different packets having different sources and different destinations. These packets may also vary widely in size. Every few milliseconds, one of the time-based queues dequeues its contents. In the example depicted, time-based queue $B_4$ is currently dequeuing its contents 22. These contents are then forwarded to their respective destinations on the network. In the embodiment shown, a wake-up process 20 instructs structure 18 to dequeue the contents of the next scheduled bucket. It does so every time that the specified increment of time elapses. This is the increment of time associated with each time-based queue (bucket).

Note that whenever interface 10 allows packets to be transmitted (whether by having rate policer 14 determine that no traffic shaping delay is appropriate or by having structure 18 dequeue a bucket), appropriate packets are provided to the destination network. When on the network, these packets find their way to the intended destination by whatever mechanism the destination network uses (e.g., broadcast or multicast).

As mentioned, rate policer 14 must determine whether to transmit, drop, or buffer packet 12. It may accomplish this in two steps. First, it determines whether the policy for the destination would be breached by immediately transmitting the packet. For example, a destination may be allotted a bandwidth of 1 megabits per second but only be currently using 512 kilobits per second. Because the destination is using less than its allotted bandwidth (a maximum allowed data flow), rate policer 14 will typically determine that that packet should be transmitted without delay.

If, however, immediate transmission of the packet would violate a policy implemented on policer 14, it cannot transmit the packet. It must then determine whether to drop or buffer the packet. Typically, this is accomplished by first calculating a traffic shaping delay required before the packet can be transmitted without violating the policy. If that delay is greater than some "maximum shaping delay" such as 500 milliseconds, block 14 will drop the packet. Often this maximum shaping delay corresponds to the aggregate length of time for all time-based queues in structure 18. This size is sometimes referred to as the "period of time" for all the time-based queues in structure 18.

Assuming that the traffic shaping delay is less than the maximum shaping delay, block 14 forwards the packet to traffic shaper 16. It is now the job of traffic shaper 16 to determine which of the buckets of structure 18 should be used to buffer the packet under consideration. It may accomplish this by finding a bucket that is scheduled to dequeue its contents at or near the time when the calculated traffic shaping delay is up. Typically, it will choose the first bucket scheduled to dequeue its contents after the traffic shaping delay has passed.

The specific functional blocks presented herein such as policer block 14 and traffic shaper block 16 may be blocks of program code that, when executed, perform the functions ascribed to them. Thus, these functional blocks typically require the concerted action of one or more processors, memory, and program instructions that selectively configure processor(s) and memory. Of course, any of these functional blocks may be provided, in whole or in part, on hardware specially designed to perform at least some part of the described functions.

In a preferred embodiment, time-based queuing structure 18 is designed or configured with two parameters: a bucket width or "time increment," b and a maximum shaping delay or "period of time" M*b. M is the number of buckets in structure 18. The choice of a particular bucket within structure 18 in which to buffer a given packet may be identified by the following expression.

$$B_k = [B_{CURR} + (d(i)/b)] \bmod M.$$

In this expression, $B_k$ is the bucket identified for buffering the current packet (e.g., bucket $B_2$). It may be any one of the buckets within time-based queuing structure 18 (e.g., $B_0$, $B_1$ ... $B_{M-1}$). $B_{CURR}$ is the next bucket in structure 18 currently scheduled for dequeuing. The parameter d(i) is the traffic shaping delay calculated for the current packet in traffic flow i. Thus the value d(i)/b restates the traffic shaping delay in terms of the number buckets that must be dequeued before the packet can be transmitted. That is, d(i)/b identifies how many buckets in advance of the current bucket that the packet must be enqueued. Of course, simply summing $B_{CURR}$ with the number of buckets to advance may give a value greater than $B_{M-1}$. Therefore, it is necessary to take the modulo of $B_{CURR}$+[d(i)/b] with respect to the total number of buckets in structure 18, M.

In a preferred embodiment, the maximum shaping delay, M*b, is between about 100 and 500 milliseconds. Of course, the invention is not limited to this range. Generally, the value of this parameter will be chosen by the available memory and maximum per packet delay. The larger the value of M*b, the more packets that would need to be buffered by the shaper. A large value of M*b can potentially mean a larger per packet delay, as more time would be spent by the packet in the shaper. A very large delay would make shaping useless, as the source of packets might timeout and assume the packets have been dropped, leading to retransmissions, which is exactly what the shaper seeks to avoid in the first place. The value of b (termed the bucket's "width," "time increment," or "granularity") is chosen based upon the competing concerns of finding a bucket that precisely matches a packet's calculated delay and requiring only minimal system overhead to trigger the periodic dequeuing of buffered data. In one preferred embodiment, the value of b is between about 1 and 50 milliseconds.

In the embodiment shown in FIG. 1, wake-up process 20 regularly triggers dequeuing of successive time-based queues. This typically requires that the system issue interrupts, a fairly expensive procedure. Thus, from the perspective of system overhead, the value of b is preferably large. Unfortunately, this causes many packets to be queued for significantly longer periods of time than are required by the calculated traffic shaping delay values.

In an alternative embodiment, the system overhead associated with the queuing is reduced, thereby allowing smaller values of "b." In this embodiment, the system requires two separate dequeuing parameters: "b" and a "wake-up increment." The wake-up increment specifies the time that will elapse between successive interrupts from the system to trigger dequeuing. This may be set to a relatively large number such as 40 milliseconds. The value of "b" may be a much smaller value such as, for example, 1 millisecond. In this embodiment, dequeuing is triggered by either of two separate mechanisms. First, whenever a new piece of data is enqueued, the system may dequeue the contents of all buckets that have "timed-out" (i.e., passed their scheduled dequeuing time based on the value of "b"). Second, whenever a wake-up interrupt occurs all timed-out buckets are dequeued.

Note that if two separate enqueuing events occur within a single time increment, b, only a single time-based queue will be dequeued during these two events. However, if the next enqueuing event occurs after the time increment "b" has elapsed, the next scheduled bucket in time-based queuing structure 18 will be dequeued. In the case where two enqueuing events are separated in time by more than one time increment, b, when the second enqueuing event takes place, all time-based queues up to the current point will be dequeued. And, whenever the wake-up interrupt occurs, all time-based queues scheduled for dequeuing since the last enqueuing event will dequeued.

Note that the time-based queuing mechanism may take on a number of formats. It may, as described above, have a number of time-based queues that serve to both buffer various data items and maintain a scheduled dequeuing time. Other embodiments also group data items based upon timing rather than source or destination. These approaches are within the scope of this invention. The general structures and methods used for such embodiments will be apparent to those of skill in the art. Two general approaches are described in Randy Brown, "Calendar Queues: A Fast 0(1) Priority Queue Implemehtation For the Simulation Event Set Problem", October 1988, Volume 31, Communications of the ACM and "LSI Logic's L64364 ATMizer II+ATM-SAR Chip Technical Manual" Chapter 7, Nov. 16, 1998, for example. Both of these references are incorporated herein by reference for all purposes.

Methods of Implementing Time-Based Queuing

Figure 2:
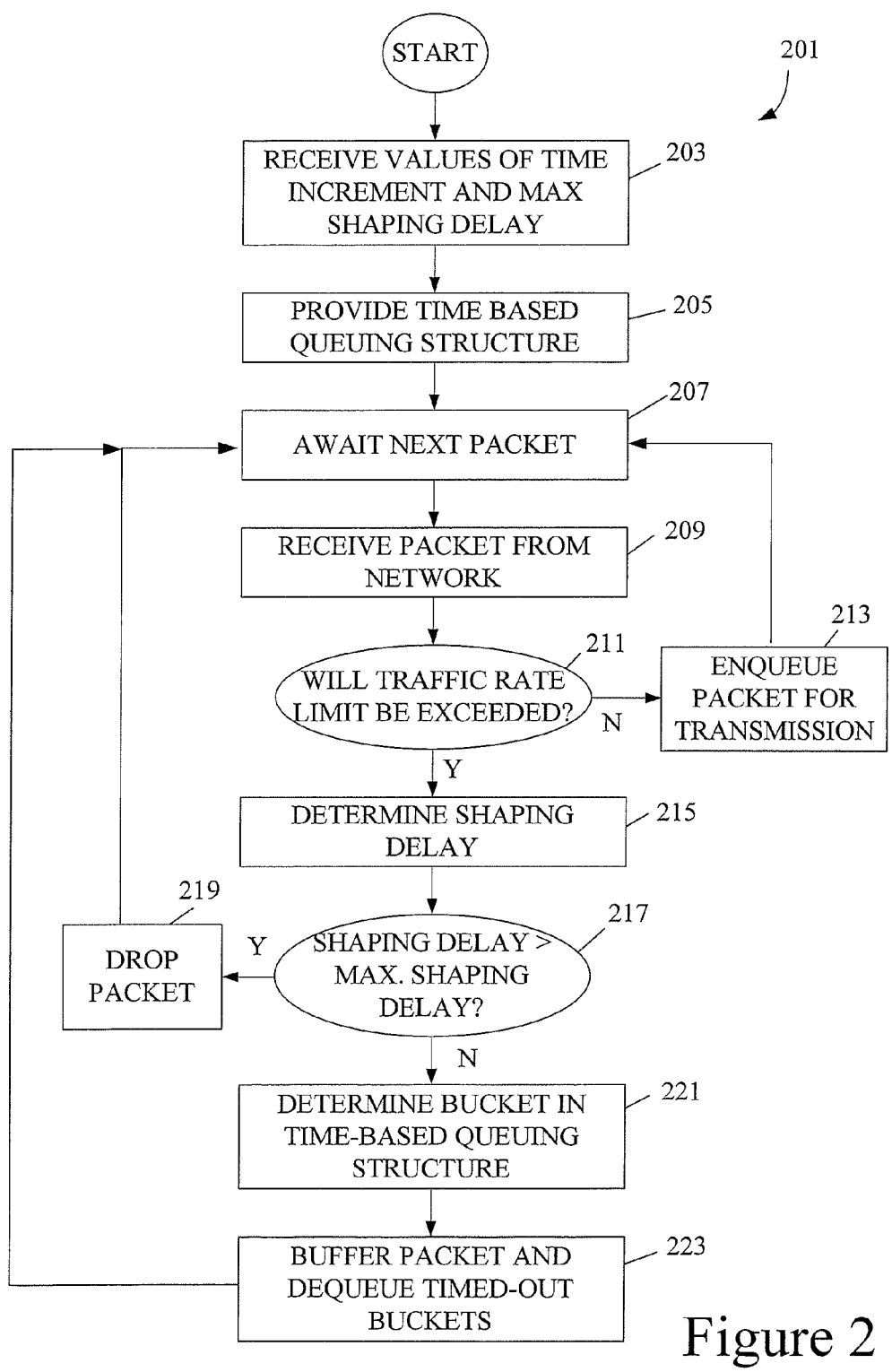
FIG. 2 is a process flow diagram illustrating a method of implementing the time-based queuing system of this invention for downstream transmission of data items.

FIG. 2 presents a process flow diagram for one method of traffic shaping in accordance with this invention. The depicted method bases the shaping process upon the destination of network traffic. The figures are presented from the perspective of a network device (or devices) that receives a packet and is responsible for controlling the transmission of that packet based upon a traffic shaping policy. Generally, the network device (or devices) is referred to as the "system."

As shown in FIG. 2, a traffic shaping process 201 begins with the system initializing the time-based queuing structure. To accomplish this, the system first receives, at 203, the values of the time increment for the individual buckets as well as the maximum shaping delay. Then, at 205, the system provides the actual time-based queuing structure having the specified time increments and maximum shaping delay. This structure may correspond to structure 18 in FIG. 1, for example.

Assuming now that the time-based queuing structure is configured or designed with the appropriate parameters, the system waits for the next packet. See 207. Eventually, the system will receive such packet from the network at 209. It must now determine whether to transmit the packet directly, and queue it, or drop it. To accomplish this, it first determines, at 211, whether the rate limit has been exceeded for the packet destination. It may make the determination using any suitable policing algorithm (e.g., "token bucket" or "long-term average"). Typically, such algorithm compares an allowed bandwidth for the destination with the bandwidth currently used or to be used (if the packet is transmitted) of the destination. The bandwidth to be used may be determined based upon an instantaneous calculation or over a defined length of time, or by some other mechanism. Either way, the system may have to calculate or otherwise determine the network capacity used by the system.

Assuming that the system determines that the rate limit will not be exceeded if the packet is transmitted to its destination (i.e., decision 211 is answered in the negative), the system will enqueue the current packet for immediate transmission at 213. In many systems, this involves providing the packet to a driver output queue. Another portion of the network system then places the packet on the network for receipt by the intended destination. Process control then returns to 207 where the system waits for the next packet to be considered.

Assuming that the system determines that the rate limit for the packet destination has been exceeded (i.e., decision 211 is answered in the affirmative), the system cannot immediately transmit the packet. Rather, it must determine whether to buffer it and, if so, where to buffer it. Initially, after 211, the system determines the shaping delay associated with the packet. See 215. This shaping delay may correspond to the variable "d(i)" discussed above. One method for computing shaping delay involves dividing the packets size (in bits) by the peak transmission rate (in bits/s) allowed for the destination. The exact calculation may use the concept of a packet deadline for each traffic flow, which denotes the time at which the next packet for this flow is scheduled for transmission based on its allowed rate. When a new packet is to be enqueued in the shaper, the deadline is calculated as:

$$\text{new\_deadline} = \text{deadline} + \text{packet\_size}/\text{data\_rate}$$

and the shaping delay is calculated as $$\text{shaping\_delay} = \text{new\_deadline} - \text{last\_dequeue\_time\_of\_shaper}.$$

After determining the value of the shaping delay, the system must determine whether to drop or buffer the packet. This is represented at 217, where the system determines whether the shaping delay for the packet is greater than the maximum shaping delay. If so, the system drops the packet at 219 and process control returns to 207 where the system waits for the next packet. As mentioned above, a higher level protocol such as TCP must eventually confirm that the packet has been dropped based on the expiry of timers or other means.

If the system determines that the shaping delay for the current packet does not exceed the maximum shaping delay (i.e., decision 217 is answered in the negative), the system next determines the bucket number for properly buffering the packet in the time-based queuing structure. See 221. As mentioned, this generally involves finding a time-based queue (bucket) scheduled to dequeue at or soon after the expiration of the shaping delay. The above expression for $B_k$ may be employed, for example.

After identifying the appropriate bucket for buffering the packet, the system next buffers that packet at that identified bucket and may dequeue packets from the buckets that have timed-out. See 223. In this example, the dequeuing is triggered by an enqueuing event. As mentioned above, this is but one mechanism of triggering dequeuing. As illustrated in FIG. 2, process control returns to 207 after the packet has been buffered. Note that in some systems, multiple packets can be treated concurrently. In other words, the system may have multiple processes, each represented by method 201 and operating in parallel on separate packets.

Figure 3:
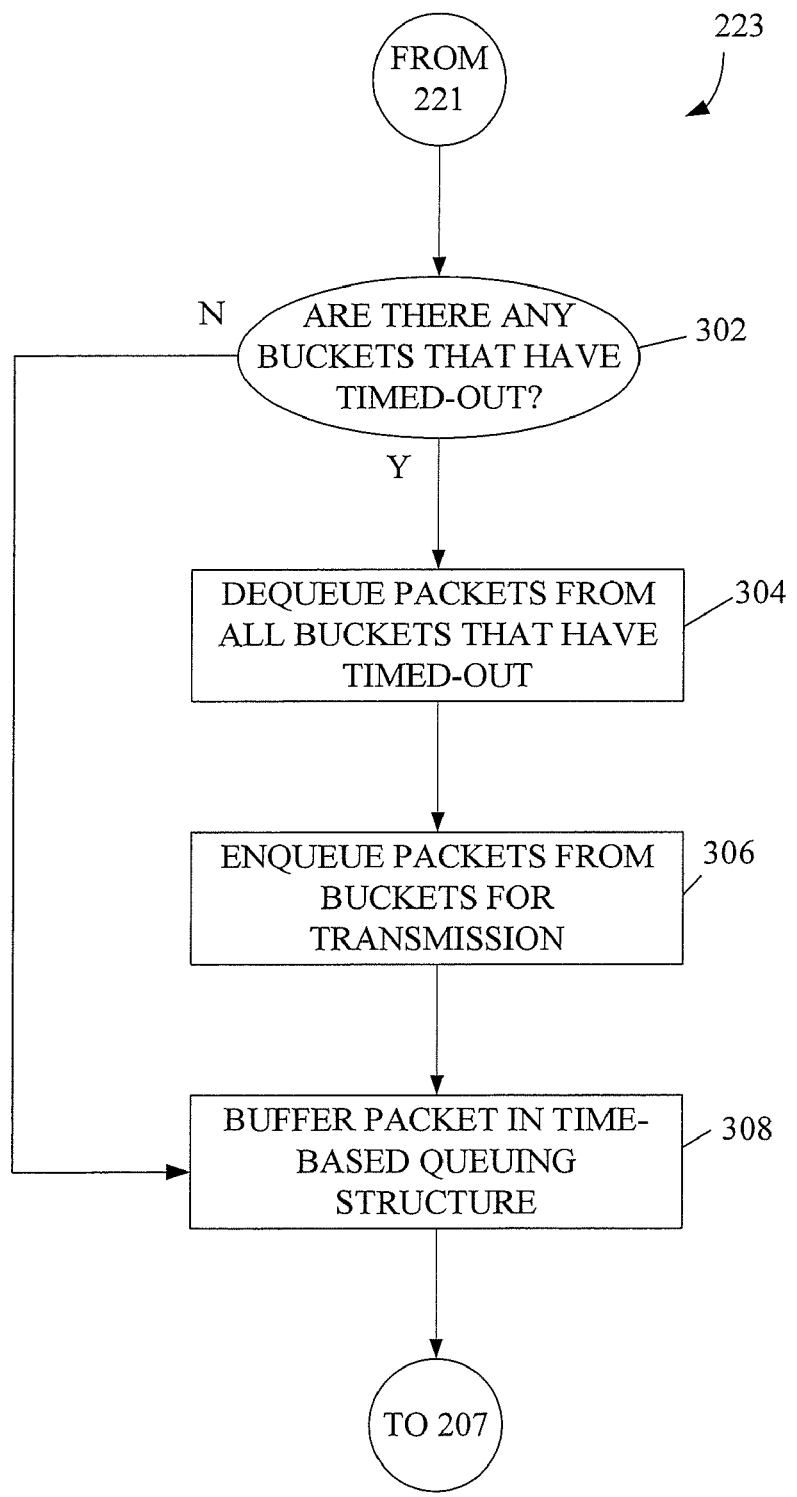
FIG. 3 is a process flow diagram illustrating how the data items handled by the method of FIG. 2 may be enqueued.

Turning now to FIG. 3, a process for buffering a packet and dequeuing timed-out buckets, in accordance with 223, is illustrated in more detail. The process begins at 302 (after 221), with the system determining whether there are any buckets in the time-based queuing structure that now need to be dequeued. In other words, these buckets were scheduled for dequeuing at a time that has now passed. If so, the system next dequeues those packets from all buckets that have timed-out. See 304. Those packets are then enqueued for immediate transmission at 306. As mentioned above, with respect to 213, such packets may be enqueued in a driver output queue. Finally, at 308, the packet under consideration is enqueued within the time-based queuing structure for later transmission. At this point, process control is directed back to 207 (see FIG. 2). Note that if the system determines that there are no buckets that have timed-out (i.e., decision 302 is answered in the negative), process control is directed to 308.

In the embodiment depicted in FIG. 3, some mechanism should preferably be employed to "back up" the specified dequeuing mechanism. In the flow chart of FIG. 3, dequeuing is triggered only by an enqueuing event. If a relatively long time elapses between successive enqueuing events, dequeuing of some packets may be unduly delayed. Therefore, the system is preferably implemented with a supplemental dequeuing mechanism that relies on a periodic interrupt or periodically scheduled dequeue process to dequeue all timed-out buffers.

Figure 4:
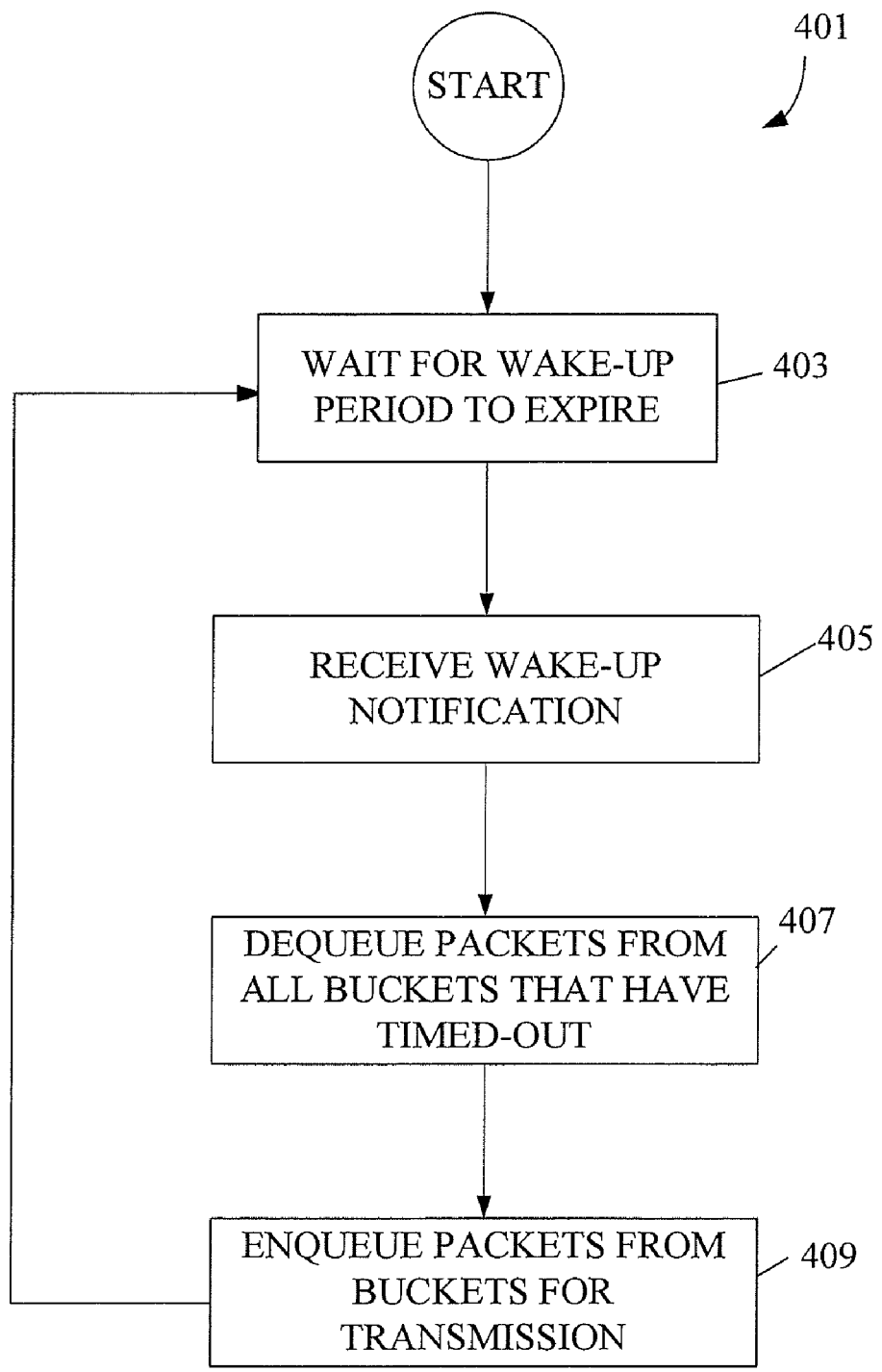
FIG. 4 is a process flow diagram depicting an interrupt based method for dequeuing data items from a collection of time-based queues.

A suitable interrupt-based dequeuing method is depicted in FIG. 4. As shown there, a dequeuing process 401 begins at 403 with the system waiting for a wake-up period to expire. Then, at 405, the system receives the wake-up notification. This may simply be an interrupt from the system scheduled for every ten or twenty milliseconds. Upon receipt of the wake-up notification, the system dequeues, at 407, all those packets in buckets that have timed-out since the last dequeuing event. Note that the last dequeuing event may have been an enqueuing event as depicted at 308 in FIG. 3. Finally, the system enqueues those packets dequeued at 407 for immediate transmission (in a driver output queue), for example. Process control then returns to 403 where the system awaits the next wake-up period to expire.

The discussion of FIGS. 2 and 3 has assumed that the traffic policing and traffic shaping algorithms are based upon a packet's destination. This, however, need not be the case. It may be that the source of the packet has an allowed amount of bandwidth and a maximum shaping delay that must be considered. In such case, the system will determine a shaping delay based upon the source's allowed bandwidth. Typically, this presents no special implementation difficulties. In the case of a cable modem plant or other medium where a fixed amount of bandwidth is shared among multiple subscribers (e.g., satellite networks, cellular networks, etc.), however, nodes may be allotted only a fixed amount of upstream bandwidth. Upstream transmissions from such nodes may follow a protocol that requires the nodes to first request a time slot for upstream transmission and then transmit data only after that time slot has been granted by a traffic control system such as the cable modem termination system in a cable plant.

Figure 6:
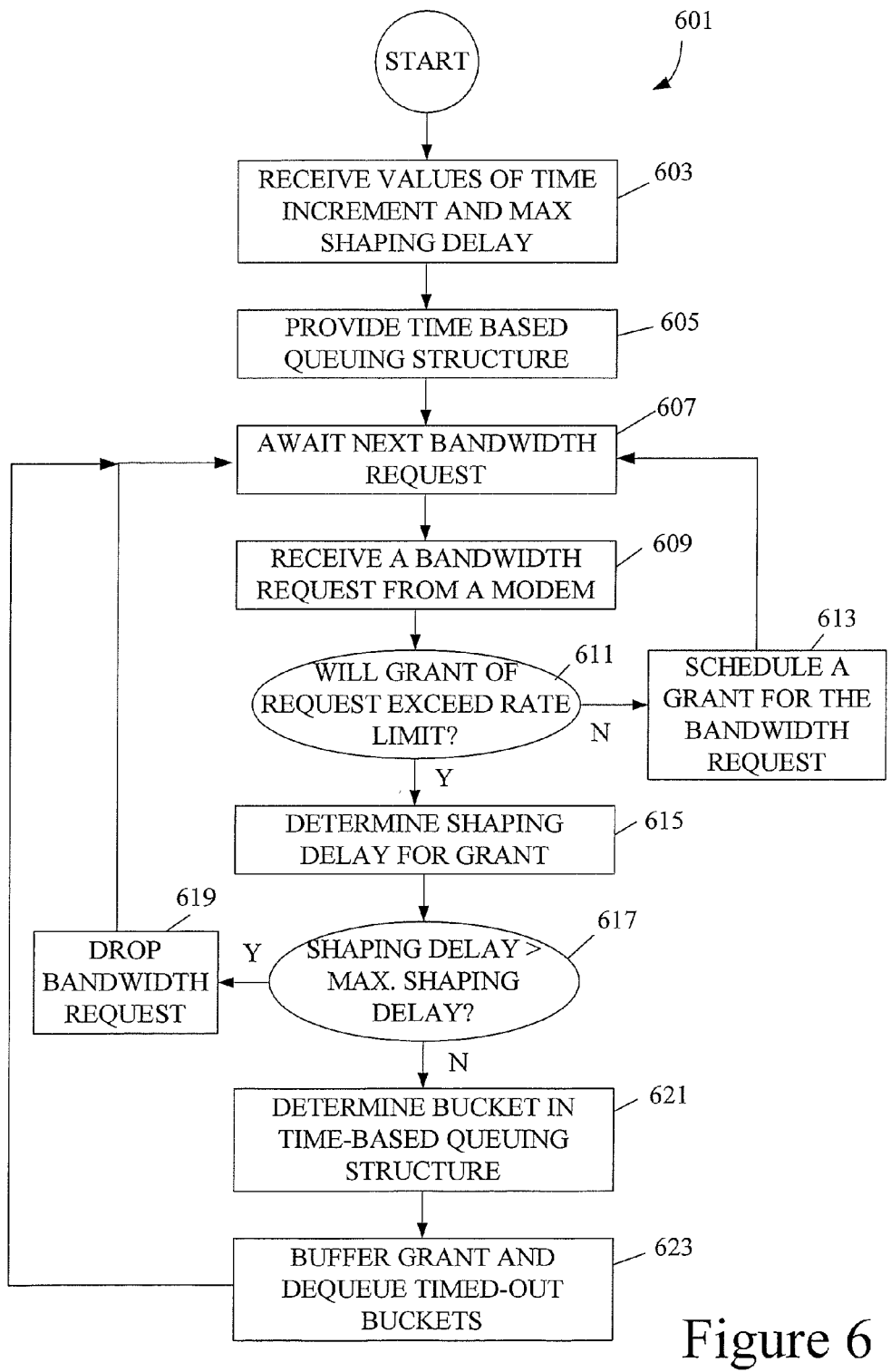
FIG. 6 is a process flow diagram depicting a time-based queuing method of this invention as applied to granting bandwidth requests to cable modems or other network entities.

FIG. 6 depicts one procedure for shaping upstream traffic in accordance with this invention. Before discussing the process of FIG. 6, however, it is useful to consider a cable plant and the "MAP" structures used to broadcast grants of time slots for upstream transmission to the various cable modems in the plant.

Figure 5A:
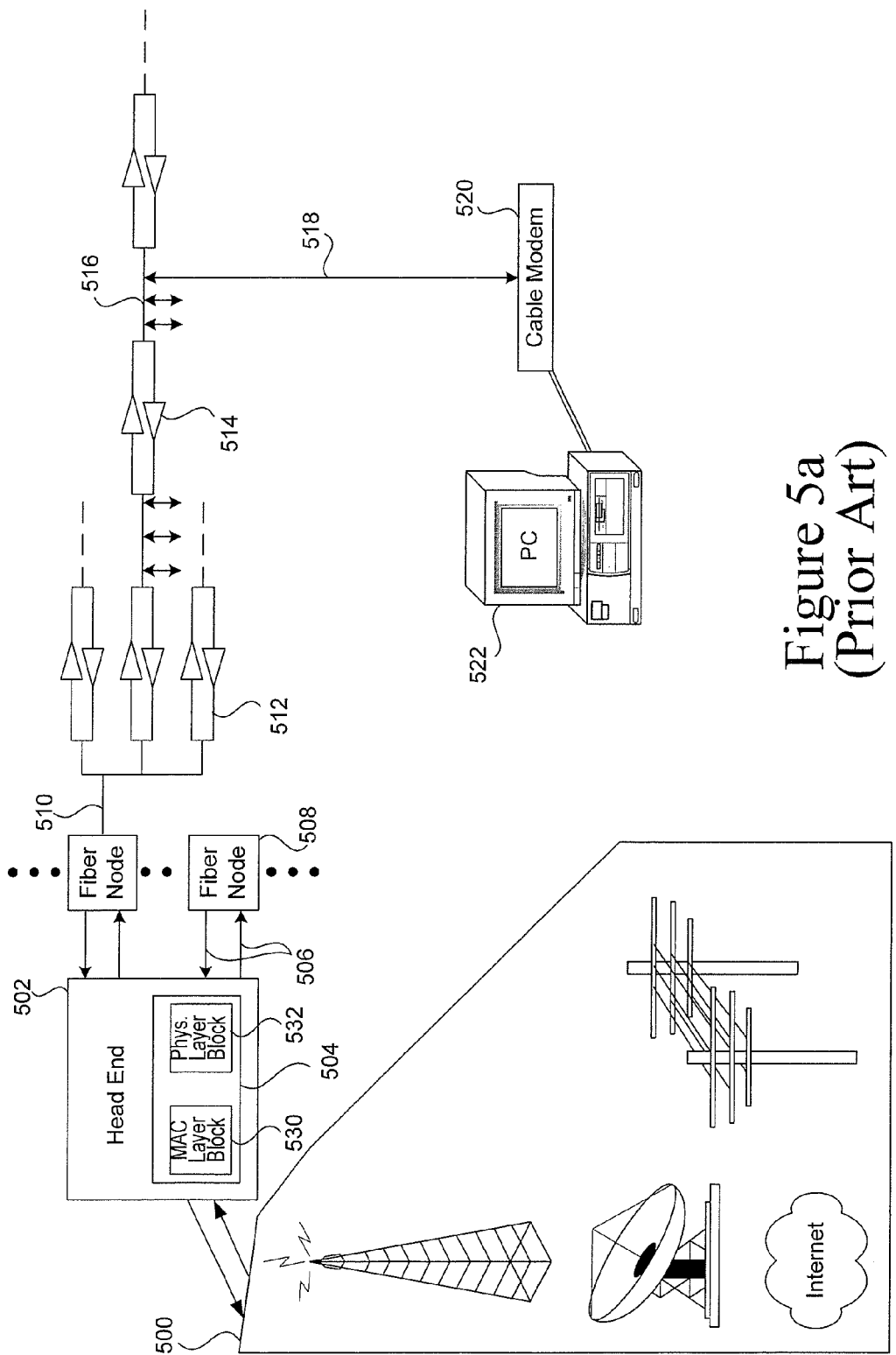
FIG. 5A is a schematic illustration of a cable modem plant that may be used with the present invention.

FIG. 5A presents some elements of a typical cable modem system. The depicted cable system is a two-way hybrid fiber-coaxial (HFC) cable system utilizing a cable modem for data transmission. It includes a head end 502 (essentially a distribution hub) that can typically service about 40,000 subscribers. Head end 502 contains a cable modem termination system (CMTS) 504 that is needed when transmitting and receiving data using cable modems. The primary functions of the CMTS are (1) receiving signals from external sources 500 and converting the format of those signals; (2) providing appropriate Media Access Control ("MAC") level packet headers (as specified by the DOCSIS standard) for data received by the cable system, (3) modulating and demodulating the data to and from the cable system, and (4) converting the electrical signal in the CMTS to an intermediate frequency.

Head end 502 is connected through pairs of fiber optic lines 506 (one line for each direction) to a series of fiber nodes 508. Each head end can support normally up to 80 fiber nodes. Each of the fiber nodes 508 is connected by a coaxial cable 510 to two-way amplifiers or duplex filters 512 which permit certain frequencies to go in one direction and other frequencies to go in the opposite direction. Each fiber node 508 can normally service up to 500 subscribers. Fiber node 508, coaxial cable 510, two-way amplifiers 512, plus distribution amplifiers 514 along trunk line 516, and subscriber taps, i.e. branch lines 518, make up the coaxial distribution system of an HFC system. Subscriber tap 518 is connected to a cable modem 520. Cable modem 520 is, in turn, connected to a subscriber computer 522.

The described HFC cable systems may be used for two-way transmission of digital data such as Internet data, digital audio, or digital video data, in MPEG format, for example, from one or more external sources 500. The digital data is carried over radio frequency (RF) carrier signals. Cable modems convert digital data to a modulated RF signal and convert the RF signal back to digital form. The conversion is done at two points: at the subscriber's home by a cable modem and by a CMTS located at the head end. The CMTS converts the digital data to a modulated RF signal that is carried over the fiber and coaxial lines to the subscriber premises. The cable modem then demodulates the RF signal and feeds the digital data to a computer. On the return path, the operations are reversed. The digital data is fed to the cable modem, which converts it to a modulated RF signal (it is helpful to keep in mind that the word "modem" is derived from modulator/demodulator). Once the CMTS receives the RF signal, it demodulates it and transmits the digital data to an external source.

Data packets are addressed to specific modems by a MAC layer block 530 in CMTS 504 (there is also a MAC addressing component, not shown, in the cable modems that encapsulate data with a header containing the address of the hub when data is being sent upstream). CMTS 504 also has a physical layer block 532 for receiving and transmitting RF signals on the HFC cable plant. MAC layer block 530 may encapsulate a data packet within a MAC header according to the DOCSIS standard for transmission of data. This standard is currently a draft recommendation (J.isc Annex B) which has been publicly presented to Study Group 9 of the ITU in October 1997. MAC layer block 530 contains the necessary logic to encapsulate data with the appropriate MAC addresses of the cable modems on the system. Each cable modem on the system has its own MAC address. Whenever a new cable modem is installed, its address is registered with MAC layer block 530. MAC layer block 530 is also responsible for sending out polling messages as part of the link protocol between the CMTS and the cable modems that is necessary to maintain a communication connection between the two.

Basic data connectivity on the cable system typically requires a single upstream channel (to carry return signals from the cable modem to the cable head-end) and a single downstream channel carrying signals from the head-end to the cable modems. A cable access network typically comprises multiple upstream channels and multiple downstream channels.

On the downstream cable data channel, data is broadcast by a single head-end CMTS to cable modems served on that downstream channel. However, the upstream channel is complicated by the fact that it is used as a multiple access channel which is shared by the large group of cable modems (on that channel) to communicate with the CMTS. The upstream channel is time-slotted and cable modems need to contend for gaining access to the CMTS in this shared channel.

Typically, time slots are scheduled using a "minislot" as the basic unit of scheduling. The CMTS remotely schedules each and every minislot on the upstream channel. Some contiguous minislots are grouped together as a unicast data slot meant to be used by a specific cable modem for sending its data upstream. Some minislots are marked as contention slots that can be used by any cable modem to send ranging/bandwidth requests upstream to the CMTS. The CMTS conveys this minislot allocation information (to the set of modems sharing the upstream channel) ahead of time using bandwidth allocation MAP messages that are periodically broadcast on the downstream channel.

Figure 5B:
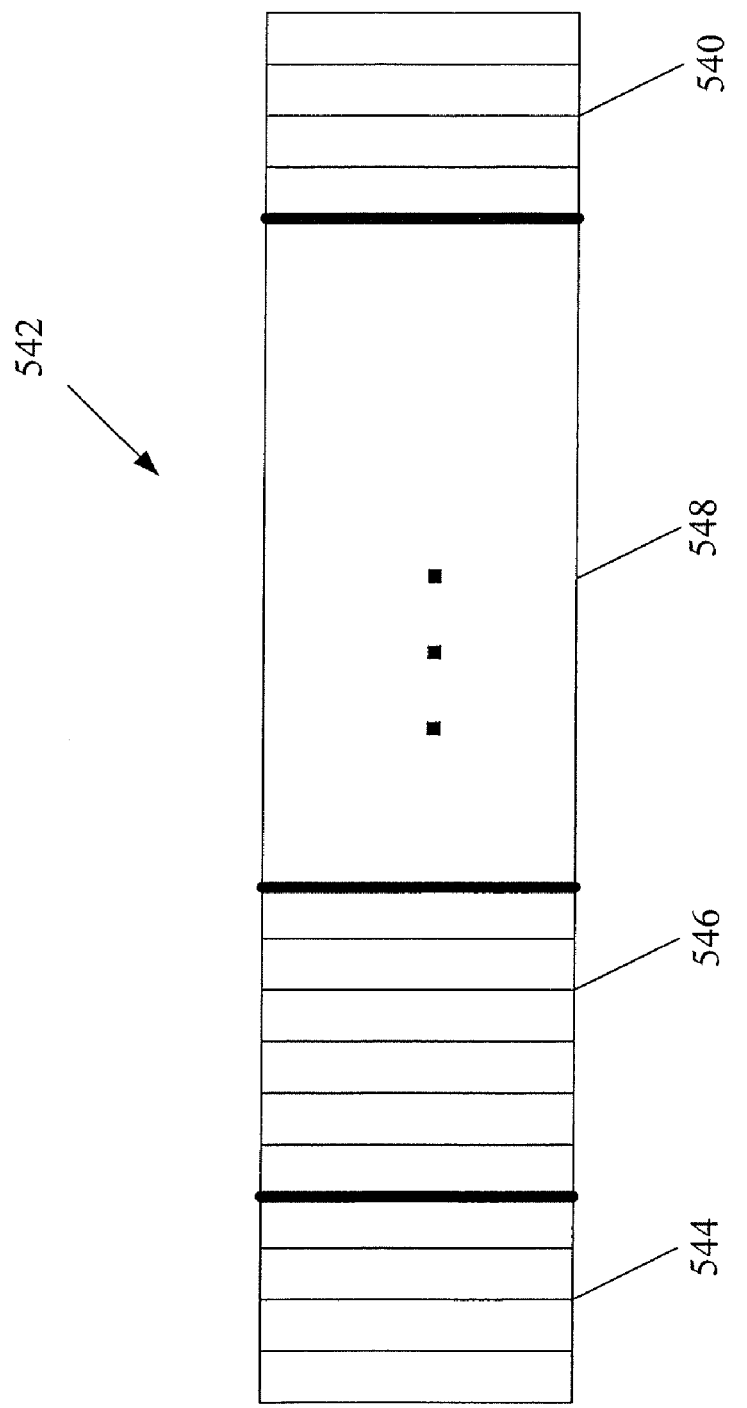
FIG. 5B is a block diagram depicting the structure of a MAP message suitable for use with the present invention.

FIG. 5B illustrates a sample MAP message 542 that may be used with the present invention. Like a conventional MAP message, MAP message 542 includes various time slots or groups of time slots representing grants for upstream transmission to various cable modems in the plant. In the example shown, a group of minislots 544 have been granted to a first cable modem. Similarly, a group of later time slots 546 have been granted to a second cable modem. The granted time slots may be of arbitrary length from a few tens of microseconds to a few milliseconds. Other slots for other cable modems may be specified in the remainder (indicated by reference numeral 548) of MAP 542.

MAPs typically grant upstream bandwidth for only a defined length of time (e.g., about 2-10 milliseconds). If a cable modem does not find a grant to its request in a conventional MAP (or in a pending grant), it assumes that no grant to its request will be forthcoming. It may then retransmit this request for a grant in the hope that that grant will appear in a subsequent MAP message.

In the present invention, which may buffer grants for upstream transmission, the individual cable modems must be notified that a grant for it has been buffered. Otherwise, the cable modem will continue to submit requests for a grant and thereby unnecessarily use system bandwidth.

To notify such cable modems of buffered grants, MAP 542 includes a pending grants section 540 which identifies all those grants that have not been allocated but will be given at some future time. These are grants stored within a time-based queuing structure of this invention. Later, in a subsequent MAP message, some of the pending grants will have been converted to actual grants and appear within the main body of the MAP message.

Turning now to FIG. 6, a process flow diagram for handling requests for grants of upstream minislots is presented. As shown there, a process 601 initially requires that a suitable time-based queuing structure be designed or configured. This is depicted at 603 and 605 where the system uses the time increments and maximum shaping delay parameters to construct an appropriate time-based queuing structure. This procedure may be essentially identical to that described for 203 and 205 of process 201 in FIG. 2.

After providing the time-based queuing structure for the appropriate parameters, the system is now ready to handle bandwidth requests (grant requests). Thus, at 607, the system awaits the next bandwidth request for a cable modem on the plant. Eventually, it receives such a request at 609. Then, at 611, it determines whether the allowed network traffic rate for the node sending the bandwidth request has been exceeded. If not, the system schedules a grant for that bandwidth request at 613. This entails making a granted minislot available for broadcast in the next MAP message. After the system schedules a grant for bandwidth request at 613, process control returns to 607 where the system awaits the next bandwidth request.

Assuming that the system determines that the rate limit for the requesting node has been exceeded, it next computes the shaping delay for the requested grant. See 615. This may involve dividing the grant size (in bits) by the peak rate allowed (in bits/s). The shaping delay may be used in the manner that the variable d(i) was used in the above description.

After the system has computed the shaping delay, it next determines whether that delay is greater than the maximum shaping delay. See 617. Assuming that the shaping delay is greater than maximally allowed, the system drops the bandwidth request at 619. This means that the bandwidth request is neither scheduled for a timeslot grant nor buffered. When the node making the request sees that the next MAP contains neither a granted timeslot nor a pending grant, it understands that the request must be resent at a later time. Note that after dropping the bandwidth request, the system returns to a wait state at 607.

Assuming that the system determines that the computed shaping delay is smaller than the maximum allowed shaping delay (i.e., decision 617 is answered in the negative), the system next determines, at 621, which bucket in the time-based queuing structure should be used to buffer a grant to the bandwidth request. As in the case described with respect to FIG. 2, this may be accomplished using the expression for $B_k$, for example. Thereafter, the grant is buffered and dequeuing of some buckets may be triggered. See 623. Then, process control returns to 607 where the system awaits the next bandwidth request.

Figure 7:
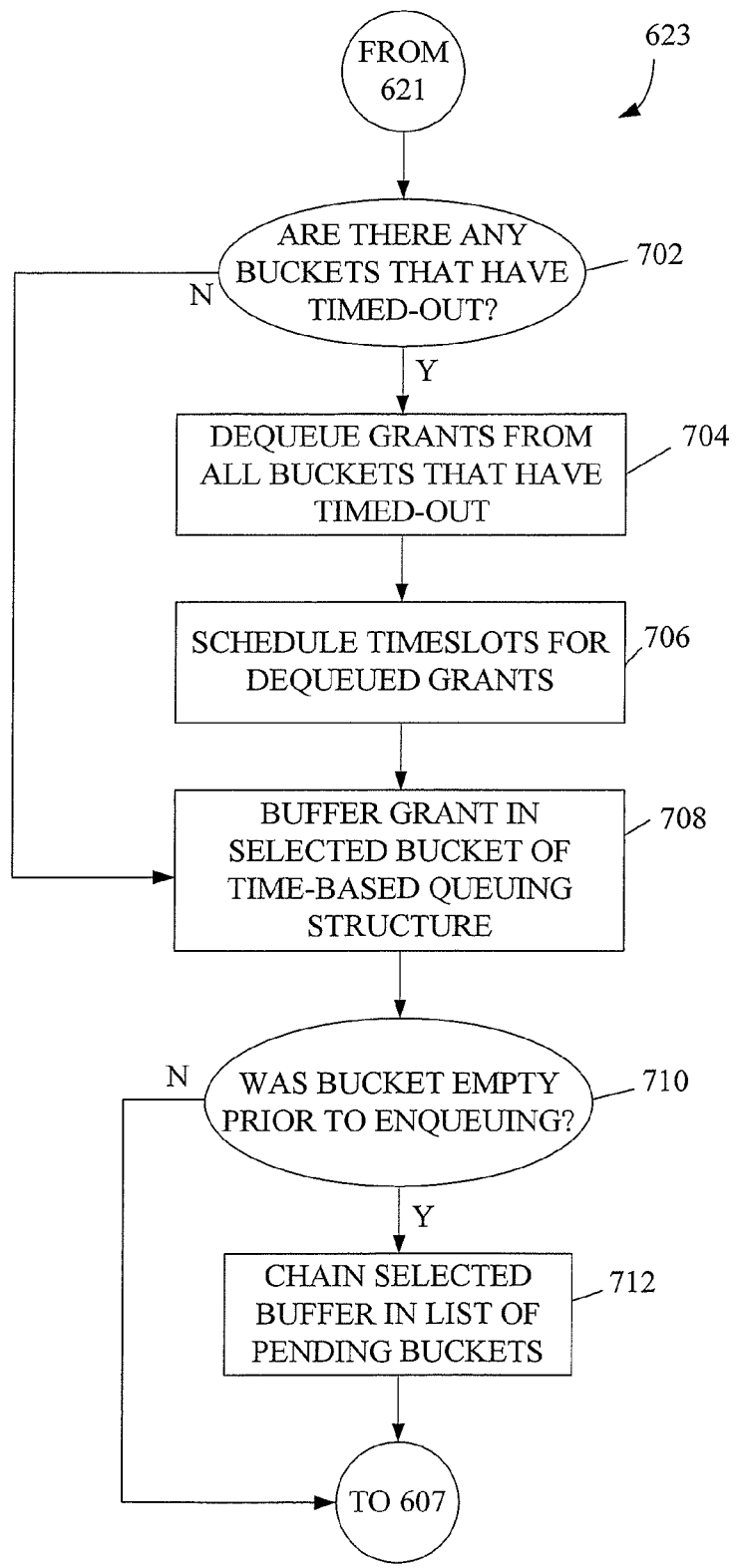
FIG. 7 is a process flow diagram depicting a method for enqueuing bandwidth requests handled in accordance with the method depicted in FIG. 6.

The process of buffering the grant and triggering some dequeuing may be implemented as depicted in FIG. 7. The process depicted there may correspond to block 623 from FIG. 6. Initially, after 621, the system determines whether there are any buckets that now need to be dequeued. See 702. This usually simply involves seeing if the present time is later than the scheduled dequeuing time for any buckets. If there are buckets that now need to be dequeued, the system dequeues grants from those buckets at 704.

Next, the system schedules each grant that was just dequeued. See 706. At this point, the grants that had been in timed-out queues are ready for incorporation in the next MAP as granted time slots.

After the necessary dequeuing procedures have been completed, the system next enqueues a grant for the bandwidth request received at 609. See 708. Note that if the system determines, at 702, that there are no buckets currently in need of dequeuing, process control is directed to 708.

After the bandwidth request under consideration has been converted to a grant and buffered at the appropriate time-based queue within the system's time-based queuing structure, the system next determines whether the time-based queue in which it is buffered was empty prior to the enqueuing. See 710. If that bucket was empty, then it must be chained in a list of pending buckets (see 712) for incorporation in the pending grants section 540 of the next MAP. After chaining the bucket in this manner, process control returns to 607, where the system awaits the next bandwidth request. In addition, if the system determines that the bucket in which the current grant is enqueued was not empty prior to the enqueuing (i.e., decision 710 is answered in the negative), process control also returns to 607.

Note that in the process depicted in FIG. 7, dequeuing of pending grants is triggered by enqueuing a fresh grant. Preferably a backup mechanism is provided which regularly triggers dequeuing regardless of whether there have been enqueuing events. In a preferred embodiment, this trigger is a "MAP interrupt." A MAP interrupt conventionally triggers generation of a MAP to notify nodes on a network of allocated time slots.

Figure 8:
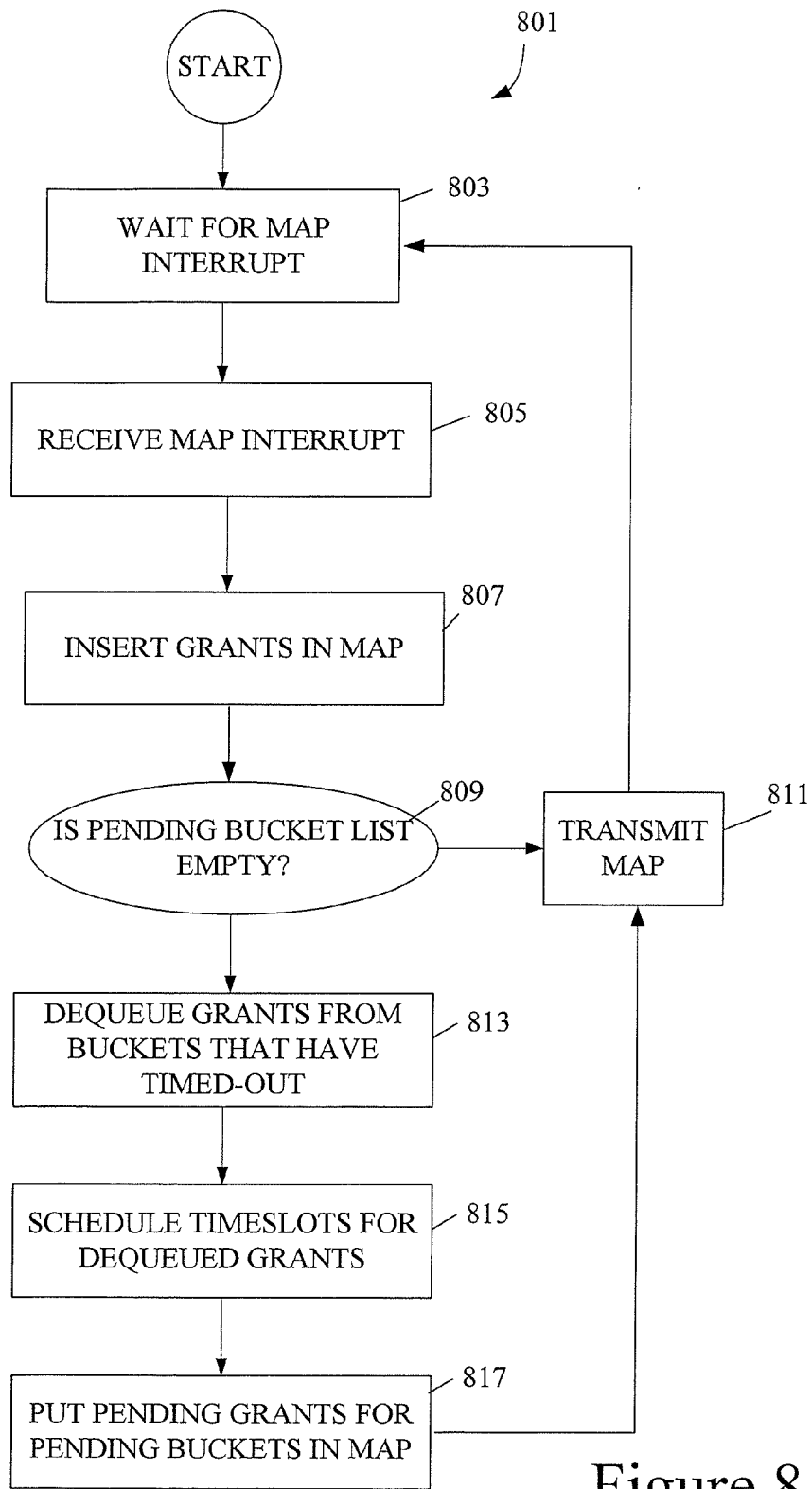
FIG. 8 is a process flow diagram depicting a MAP-interrupt method for dequeuing bandwidth grants in accordance with one embodiment of this invention.

FIG. 8 depicts a process that may be employed to dequeue pending grants when the system receives a MAP interrupt. This is represented as a process 801, which may run in parallel with process 601 depicted in FIGS. 6 and 7. As shown, process 801 begins at 803 with the system awaiting the next MAP interrupt. Eventually, the system receives such interrupt at 805. At this point, it takes a normal course of action and inserts those grants ready for immediate notification in a MAP under construction. See 807. These grants are those that are immediately available as identified when the bandwidth's rate limit has not been exceeded for the requesting node.

The system next determines, at 809, whether the pending bucket list is empty. This is the bucket list referenced at 712 in process 623 of FIG. 7. Assuming that the bucket list is empty (i.e., there are no grants pending in the time-based queuing structure), the system transmits the current map. See 811. Thereafter, process control returns to 803 where the system awaits the next MAP interrupt.

Assuming the pending bucket list is not empty, the system dequeues grants whose deadlines have expired (813) from the shaper and enqueues these grants onto the appropriate grant output queues (815). Here onwards, they are treated like normal grants and are scheduled in subsequent MAPs. Now, the current MAP is nearly constructed. It only needs to have the pending grants section appended. The system accomplishes this at 817 when it incorporates the pending grants for items in buckets identified in the pending buckets list. At this point, the current MAP is complete and it is transmitted at 811 as described above.

Network Devices for Time-Based Queuing

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example.

Figure 9:
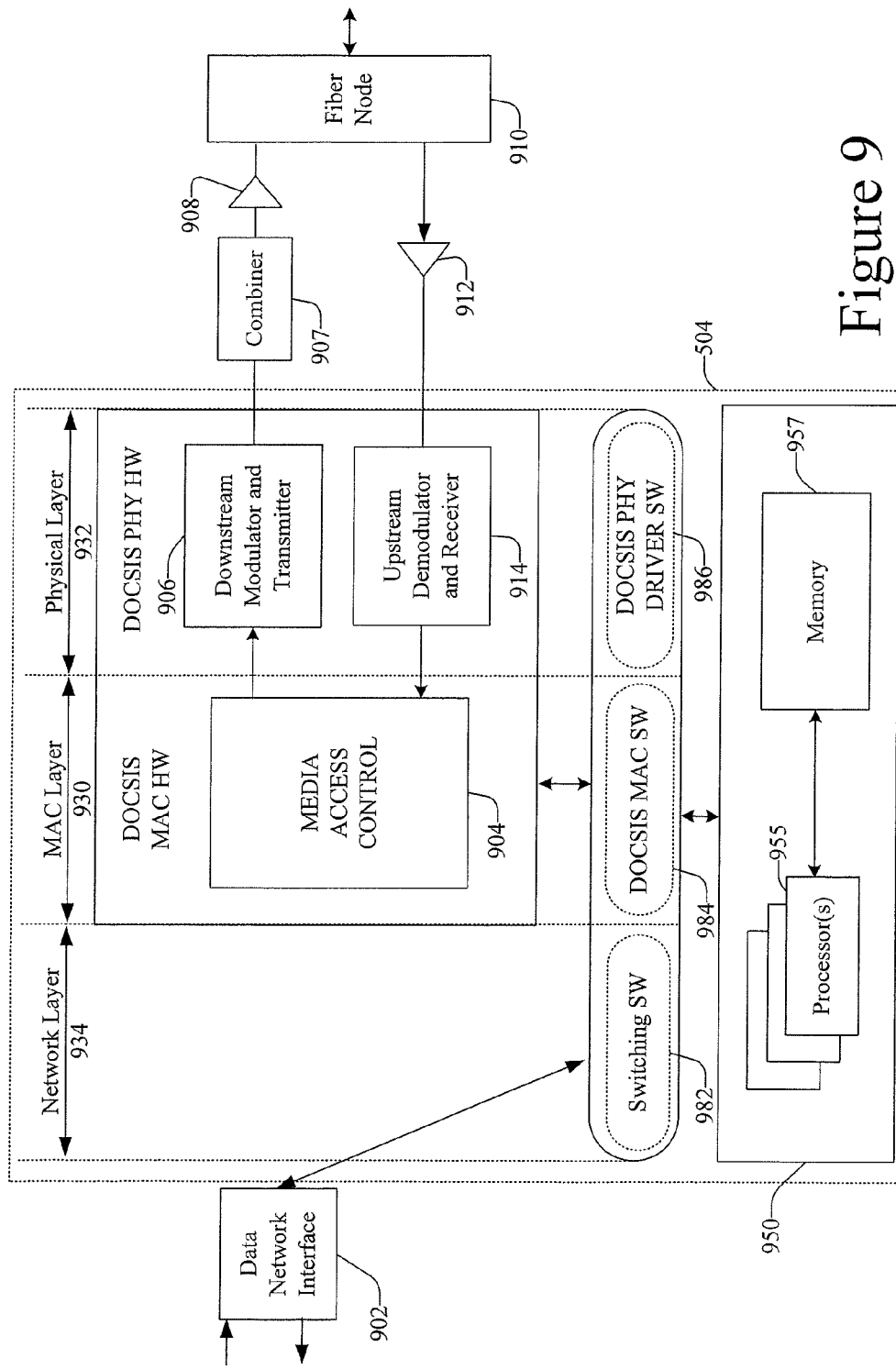
FIG. 9 is a block diagram of a cable modem termination system that may be employed to implement the present invention.

One important class of device that may be used to implement the present invention is the cable modem termination system. FIG. 9 depicts the basic components of a CMTS (e.g., item 504 of FIG. 5A). A Data Network Interface 902 is an interface component between an external data source and the cable system. As mentioned in the discussion of FIG. 5A, external data sources transmit data to data network interface 902 via optical fiber, microwave link, satellite link, or through various other media. Also as mentioned above, a Media Access Control Block (MAC Block) 904 receives data packets from a Data Network Interface 902 and encapsulates them with a MAC header In a specific embodiment as shown in FIG. 9, CMTS 504 provides functions on three network layers including a physical layer 932, a Media Access Control (MAC) layer 930, and a network layer 934. Generally, the physical layer is responsible for receiving and transmitting RF signals on the cable plant. Hardware portions of the physical layer include a downstream modulator and transmitter 906 and an upstream demodulator and receiver 914. The physical layer also includes software 986 for driving the hardware components of the physical layer.

Once an information packet is demodulated by the demodulator/receiver 914, it is then passed to MAC layer 930. A primary purpose of MAC layer 930 is to encapsulate and decapsulate packets within a MAC header, preferably according to the above-mentioned DOCSIS standard for transmission of data or other information.

MAC layer 930 includes a MAC hardware portion 904 and a MAC software portion 984, which function together to encapsulate information packets with the appropriate MAC address of the cable modem(s) on the system. After the upstream information has been processed by MAC layer 930, it is then passed to network layer 934. Network layer 934 includes switching software 982 for causing the upstream information packet to be switched to an appropriate data network interface on data network interface 902.

When a packet is received at the data network interface 902 from an external source, the switching software within network layer 934 passes the packet to MAC layer 930. MAC block 904 transmits information via a one-way communication medium to downstream modulator and transmitter 906. Downstream modulator and transmitter 906 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthognal Frequency Divison Multiplexing), FSK (FREQ Shift Keying)). The return data is likewise modulated using, for example, QAM 16 or QSPK. Data from other services (e.g. television) is added at a combiner 907. Converter 908 converts the modulated RF electrical signals to optical signals that can be received and transmitted by a Fiber Node 910 to the cable modem hub.

It is to be noted that alternate embodiments of the CMTS (not shown) may not include network layer 934. In such embodiments, a CMTS device may include only a physical layer and a MAC layer, which are responsible for modifying a packet according to the appropriate standard for transmission of information over a cable modem network. The network layer 934 of these alternate embodiments of CMTS devices may be included, for example, as part of a conventional router for a packet-switched network.

In a specific embodiment, the network layer of the CMTS is configured as a cable line card coupled to a standard router that includes the physical layer 932 and MAC layer 930. Using this type of configuration, the CMTS is able to send and/or receive IP packets to and from the data network interface 902 using switching software block 982. The data network interface 902 is an interface component between external data sources and the cable system. The external data sources transmit data to the data network interface 902 via, for example, optical fiber, microwave link, satellite link, or through various media. The data network interface includes hardware and software for interfacing to various networks such as, for example, Ethernet, ATM, frame relay, etc.

As shown in FIG. 9, CMTS 504 includes a hardware block 950 including one or more processors 955 and memory 957. These hardware components interact with software and other hardware portions of the various layers within the CMTS. Memory 957 may include, for example, I/O memory (e.g. buffers), program memory, shared memory, etc. Hardware block 950 may physically reside with the other CMTS components.

In one embodiment, the software entities 982, 984, and 986 are implemented as part of a network operating system running on hardware 950. Further, the policer and shaper functional blocks of this invention are preferably implemented in software as part of the operating system.

The traffic shaping methods of this present invention may be implemented on various systems other than cable modem systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Figure 10:
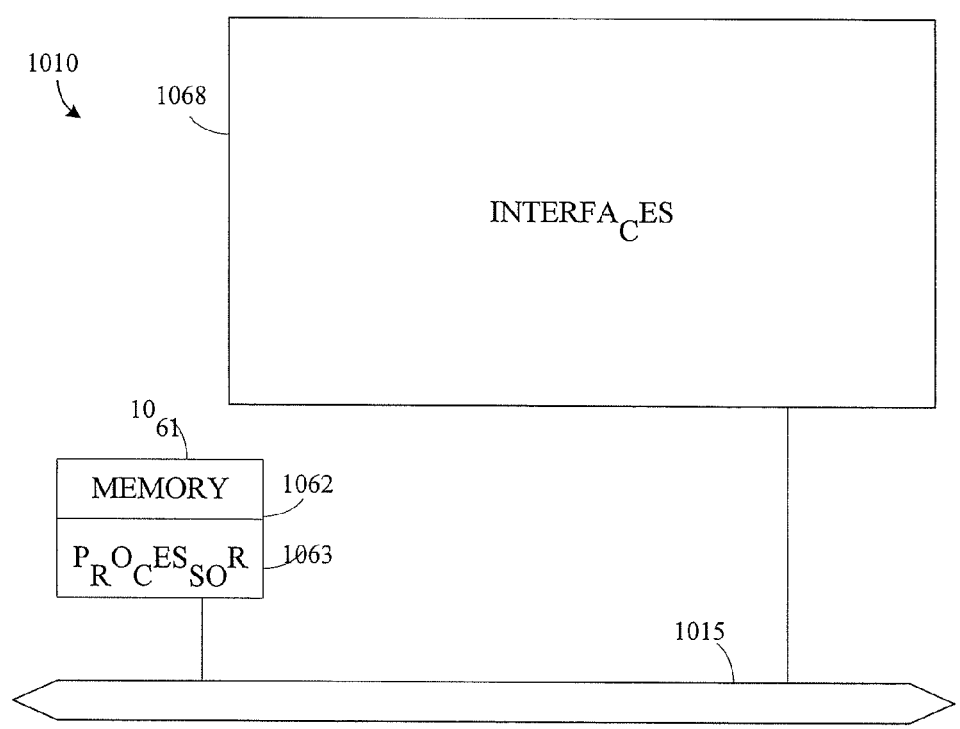
FIG. 10 is a block diagram of a router that may be used in conjunction with the methods of the present invention.

Referring now to FIG. 10, a router 1010 suitable for implementing the present invention includes a master central processing unit (CPU) 1062, interfaces 1068, and a bus 1015 (e.g., a PCI bus). When acting under the control of appropriate software or firmware, the CPU 1062 is responsible for such router tasks as routing table computations and network management. It may also be responsible for traffic shaping, etc. It preferably accomplishes all these functions under the control of software including an operating system (e.g., the Internetwork Operating System (IOS®) of Cisco Systems, Inc.) and any appropriate applications software. CPU 1062 may include one or more processors 1063 such as a processor from the Motorola family of microprocessors or the MIPS family of microprocessors. In an alternative embodiment, processor 1063 is specially designed hardware for controlling the operations of router 1010. In a preferred embodiment, a memory 1061 (such as non-volatile RAM and/or ROM) also forms part of CPU 1062. However, there are many different ways in which memory could be coupled to the system.

The interfaces 1068 are typically provided as interface cards (sometimes referred to as "line cards"). Generally, they control the sending and receiving of data packets over the network and sometimes support other peripherals used with the router 1010. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 1061) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims.

What is claimed is:

1. An apparatus for controlling data flow through a network, the apparatus comprising:
   one or more processors;
   memory coupled to at least one of the one or more processors; and
   a plurality of time-based queues logically configured on the memory and together defining a period of time with each time-based queue defining a separate increment of time within the period of time, whereby each time-based queue is set to dequeue all of its contents at a separate time, every time that a specified increment of time elapses,
   wherein the processor is configured or designed to (a) determine whether there are time-based queues that are scheduled to be dequeued at a time after the expiration of a network traffic shaping delay, (b) dequeue packets from those time-based queues scheduled to be dequeued, and (c) direct (i) data or (ii) grants to transmit data to particular time-based queues based upon network traffic shaping delays prescribed for the data or grants to transmit the data, wherein each time-based queue is configured to dequeue more than one packet.

2. The apparatus of claim 1, wherein the apparatus is a router.

3. The apparatus of claim 1, wherein the apparatus is a cable modem termination system.

4. The apparatus of claim 1, wherein the separate increments of time defined by the time-based queues are each of the same length.

5. The apparatus of claim 1, wherein the separate increments of time defined by the time-based queues are configurable.

6. The apparatus of claim 1, wherein the period of time defined by the plurality of time-based queues are configurable.

7. The apparatus of claim 1, wherein the one or more processors are further configured or designed to determine network traffic shaping delay.

8. The apparatus of claim 1, wherein the one or more processors are further configured or designed to discard data or a request to grant transmission of data if a network traffic shaping delay is greater than the period of time defined by the plurality of time-based queues.

9. The apparatus of claim 1, wherein the one or more processors are further configured or designed to transmit, without buffering in a time-based queue, the data or issue grants to transmit data if there is no network traffic shaping delay.

10. The apparatus of claim 1, wherein the one or more processors are further configured or designed to direct network packets of varying sizes to the time-based queues.

11. The apparatus of claim 1, wherein the apparatus is configured or designed to simultaneously buffer, in a single time-based queue, data or grants to transit data from a plurality of network nodes.

12. An apparatus for controlling data flow through a network, the apparatus comprising:

traffic shaping means for determining how long to buffer data or grants to transmit data; and buffering means for buffering the data or grants to transmit data in a plurality of time-based queues together defining a period of time, with each time-based queue defining a separate increment of time within the period of time, whereby each time-based queue is set to dequeue all of its contents at a separate time, every time that a specified increment of time elapses, wherein the apparatus is configured or designed to (a) determine whether there are time-based queues that are scheduled to be dequeued at a time after the expiration of a network traffic shaping delay, and (b) dequeue packets from those time-based queues scheduled to be dequeued, wherein each time-based queue is configured to dequeue more than one packet.

13. The apparatus of claim 12, wherein the traffic shaping means also directs data or grant to transmit data to particular time-based queues based upon a determined length of time for buffering.

14. The apparatus of claim 12, further comprising a policing means for determining whether to buffer the data or grants to transmit data.

15. A method of controlling data flow through a network, the method comprising:

determining that transmitting additional data to or from a network node will breach a policy for the network node;

selecting one of a plurality of time-based queues that together define a period of time, with each time-based queue defining a separate increment of time within the time period, whereby each time-based queue is set to dequeue all of its contents at a separate time associated with its increment of time, every time that a specified increment of time elapses, wherein selecting the time-based queue comprises determining whether the selected time-based queue is scheduled to be dequeued at a time after expiration of a network traffic shaping delay dequeuing packets from the selected one of the plurality of queues scheduled to be dequeued; and buffering the additional data or a grant to transmit the additional data in the selected one of the plurality of time-based queues, wherein at least some times when dequeuing of all its contents, a time-based queue dequeues more than one packet.

16. The method of claim 15, further comprising receiving data addressed to the network node prior to determining that transmitting additional data will breach the policy, and wherein the data addressed to the network node is the additional data.

17. The method of claim 15, further comprising receiving data sent by the network node prior to determining that transmitting the additional data will breach the policy, and wherein the data sent by the network node is the additional data.

18. The method of claim 15, further comprising calculating a network capacity used by the network node if the additional data was to be transmitted, the calculation being performed prior to determining that transmitting the additional data will breach the policy.

19. The method of claim 15, further comprising determining a delay until the additional data can be transmitted, wherein the determined delay is used to select the time-based queue.

20. The method of claim 19, wherein the time-based queue is selected by matching its time to dequeue with the delay determined for the additional data.

21. The method of claim 15, further comprising:
dequeuing the additional data; and
transmitting the additional data without exceeding the maximum allowed data flow for the network.

22. The method of claim 15, further comprising:
receiving new data that does not form part of the additional data;
determining that transmitting the new data will breach the policy;
determining a delay until the new data can be transmitted without exceeding the maximum allowed data flow for the network node; and
determining that the delay is sufficiently long that the new data is discarded without buffering in the time-based queues.

23. The method of claim 15, wherein the separate increments of time defined by the time-based queues are each of the same size.

24. The method of claim 15, wherein the increments of time defined by the time-based queues are configurable, and wherein the period of time defined by the plurality of time-based queues is configurable.

25. A computer program product comprising a machine-readable storage medium on which are stored program instructions for controlling data flow through a network, the program instructions comprising:

determining that transmitting additional data to or from a network node will breach a policy for the network node;

selecting one of a plurality of time-based queues that together define a period of time, with each time-based queue defining a separate increment of time within the time period, whereby each time-based queue is set to dequeue all of its contents at a separate time associated with its increment of time, every time that a specified increment of time elapses, wherein selecting the time-based queue comprises determining whether the selected time-based queue is scheduled to be dequeued at a time after expiration of a network traffic shaping delay;

dequeuing packets from the selected one of the plurality of queues scheduled to be dequeued; and buffering the additional data or a grant to transmit the additional data in the selected one of the plurality of time-based queues, wherein at least some times when dequeuing of all its contents, a time-based queue dequeues more than one packet.

26. The computer program product of claim 25, further comprising program instructions for calculating a network capacity used by the network node if the additional data was to be transmitted, the calculation being performed prior to determining that transmitting the additional data will breach the policy.

27. The computer program product of claim 25, further comprising program instructions for:

receiving new data that does not form part of the additional data;

determining that transmitting the new data will breach the policy;

determining a delay until the new data can be transmitted without exceeding the maximum allowed data flow for the network node; and determining that the delay is sufficiently long that the new data is discarded without buffering in the time-based queues.

28. A computer program product comprising a machine readable storage medium on which is provided program instructions for controlling data flow through a network, the program instructions comprising:

program code for determining that transmitting additional data to or from a network node will breach a policy for the network node;

program code for selecting one of a plurality of time-based queues that together define a period of time, with each time-based queue defining a separate increment of time within the time period, whereby each time-based queue is set to dequeue all of its contents at a separate time associated with its increment of time, every time that a specified increment of time elapses, wherein selecting the time-based queue comprises determining whether the selected time-based queue is scheduled to be dequeued at a time after expiration of a network traffic shaping delay;

program code for dequeuing packets from the selected one of the plurality of queues scheduled to be dequeued; and program code for buffering the additional data or a grant to transmit the additional data in the selected one of the plurality of time-based queues, wherein at least some times when de-queuing of all its contents, a time-based queue dequeues more than one packet.

29. An apparatus for controlling data flow through a network, the apparatus comprising:

means for determining that transmitting additional data to or from a network node will breach a policy for the network node;

means for selecting one of a plurality of time-based queues that together define a period of time, with each time-based queue defining a separate increment of time within the time period, whereby each time-based queue is set to dequeue all of its contents at a separate time associated with its increment of time, every time that a specified increment of time elapses; and means for buffering the additional data or a grant to transmit the additional data in the selected one of the plurality of time-based queues, wherein the apparatus is configured or designed to (a) determine whether there are time-based queues that are scheduled to be dequeued at a time after the expiration of a network traffic shaping delay, and (b) dequeue packets from those time-based queues scheduled to be dequeued, wherein each time-based queue is configured to dequeue more than one packet.

\* \* \* \* \*